United States Patent
Agarwal et al.

(10) Patent No.: US 7,382,260 B2
(45) Date of Patent: Jun. 3, 2008

(54) HOT SWAP AND PLUG-AND-PLAY FOR RFID DEVICES

(75) Inventors: Abhishek Agarwal, Hyderabad (IN); Mohamed Fakrudeen Ali Ahmed, Coimbatore (IN); Janaki Ram Goteti, Hyderabad (IN); Anush Kumar, Seattle, WA (US); Balasubramanian Sriram, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 420 days.

(21) Appl. No.: 11/140,726

(22) Filed: May 31, 2005

(65) Prior Publication Data

US 2006/0047787 A1 Mar. 2, 2006

Related U.S. Application Data

(60) Provisional application No. 60/606,281, filed on Sep. 1, 2004, provisional application No. 60/606,577, filed on Sep. 2, 2004.

(51) Int. Cl.
*G08B 13/14* (2006.01)

(52) U.S. Cl. ............... 340/572.1; 340/568.1; 340/568.4; 340/310.18; 340/10.5; 340/10.52; 700/221; 709/250

(58) Field of Classification Search ............ 340/572.1, 340/568.1, 568.4, 310.11, 310.18, 10.5, 10.52, 340/825.69; 700/221, 224, 115; 709/250
See application file for complete search history.

(56) References Cited

U.S. PATENT DOCUMENTS

| | | | |
|---|---|---|---|
| 5,650,768 A | 7/1997 | Eswaran | |
| 5,910,776 A * | 6/1999 | Black | 340/10.1 |
| 6,405,261 B1 * | 6/2002 | Gaucher | 709/250 |
| 6,631,363 B1 | 10/2003 | Brown et al. | |
| 6,677,852 B1 | 1/2004 | Landt | |
| 6,732,923 B2 | 5/2004 | Otto | |
| 6,784,802 B1 | 8/2004 | Stanescu | |
| 6,908,034 B2 | 6/2005 | Alleshouse | |
| 6,943,683 B2 * | 9/2005 | Perret | 340/538 |
| 7,155,305 B2 * | 12/2006 | Hayes et al. | 700/224 |

(Continued)

FOREIGN PATENT DOCUMENTS

EP 11632893 3/2006

(Continued)

OTHER PUBLICATIONS

European Search Report dated Oct. 2, 2006, mailed Feb. 10, 2006 for European Patent Application Seial No. 05107796, 6 pages.

(Continued)

*Primary Examiner*—Davetta W. Goins
(74) *Attorney, Agent, or Firm*—Amin, Turocy & Calvin, LLP

(57) ABSTRACT

The subject invention provides a system and/or a method that facilitates adding a device to an RFID network and associated a process to such device. An interface can receive a new device and/or related identification data that is to be incorporated into an RFID network. A hot swap component can seamlessly adds the new device to a process within the RFID network based at least in part upon the identification data. The new device can be incorporated into the RFID network without the process stopping, restarting, and/or reconfiguring.

20 Claims, 10 Drawing Sheets

U.S. PATENT DOCUMENTS

| | | | |
|---|---|---|---|
| 7,204,409 | B2 | 4/2007 | Kumar et al. |
| 7,267,275 | B2 | 9/2007 | Cox et al. |
| 2002/0059471 | A1 | 5/2002 | Sanghvi et al. |
| 2002/0070865 | A1 | 6/2002 | Kenneth et al. |
| 2002/0170952 | A1 | 11/2002 | Alsafadi et al. |
| 2003/0135576 | A1 | 7/2003 | Bodin |
| 2003/0144926 | A1 | 7/2003 | Bodin et al. |
| 2003/0225928 | A1 | 12/2003 | Paul |
| 2003/0227392 | A1 | 12/2003 | Ebert et al. |
| 2004/0046642 | A1 | 3/2004 | Becker et al. |
| 2004/0070491 | A1* | 4/2004 | Huang et al. ............ 340/10.5 |
| 2004/0111335 | A1 | 6/2004 | Black et al. |
| 2004/0193641 | A1 | 9/2004 | Lin |
| 2004/0215667 | A1 | 10/2004 | Taylor et al. |
| 2005/0062603 | A1 | 3/2005 | Fuerst et al. |
| 2005/0092825 | A1 | 5/2005 | Cox et al. |
| 2005/0150952 | A1 | 7/2005 | Chung |
| 2005/0150953 | A1 | 7/2005 | Alleshouse |
| 2005/0237194 | A1 | 10/2005 | VoBa |
| 2006/0047789 | A1 | 3/2006 | Kumar et al. |

FOREIGN PATENT DOCUMENTS

| | | |
|---|---|---|
| WO | WO 03/102845 | 7/2003 |
| WO | 03102845 | 12/2003 |
| WO | WO 2005078633 | 8/2005 |

OTHER PUBLICATIONS

Tsetsos, et al. "Commerical Wireless Sensor Networks: Technical and Business Issues" Proceedings of the Second Annual Conference on Wireless On-Demand Network Systems and Services (Jan. 19-21, 2005) 8 pages.

Branch, et al. "Sentire: A Framework for Building Middleware for Sensor and Actuator Networks" Proceedings of the Third International Conference in Pervasive Computing and Communications Workshops Mar. 8, 2005) pp. 396-400.

Harrison, et al. "Information Management in the Product Lifecycle-the Role Networked RFID" Proceedings of the Second IEE International Conference (Jun. 24, 2004) pp. 507-512.

Bornhovd, et al. "Integrating Smart Items with Business Processes An Experience Report" Proceedings of the Thirt-Eighth Hawaii International Conference on System Science (Jan. 3, 2005) 8 pages.

Ganesh, et al. "Web Services and Multi-Channel Integration: A Proposed Framework" Proceedings of the IEEE International Conference on Web Services (Jul. 6, 2004) 8 pages.

European Search Report dated Feb. 6, 2006, mailed Feb. 6, 2006 for European Patent Application Seial No. 05107826, 7 pages.

Ortiz. "An Introduction to Java Card Technology—Part 1" http://developers.sun.com/techtopics/mobility/javacard/articles/javacard1/> last viewed Dec. 19, 2005, 14 pages.

Chen. "Understanding Java Card 2.0" URL:.com//javaworld/jw-03-1998/jw-03-javadev_p.html> last viewed Dec. 19, 2005, 12 pages.

IBM "alphaWorks: RFID Device Development Kit: Overview" http://www/alphaworks.ibm.com/tech/rfiddevice last viewed Nov. 7, 2005, 1 page.

Alien "ALR-9800 Enterprise RFID Reader" http://www.alientechnology.com/docs/AT_DS_9800_v3_WEB.pdf last viewed Nov. 17, 2005, 4 pages.

Eurpoean Search Report dated Feb. 7, 2006; mailed Feb. 7, 2006 for PCT Application Serial No. EP 05 10 8001; 7 pages.

U.S. Appl. No. 11/069,459, filed Mar. 1, 2005, Kumar, et al.

U.S. Appl. No. 11/061,356, filed Feb. 18, 2005, Kumar, et al.

U.S. Appl. No. 11/025,702, filed Dec. 29, 2004, Kumar, et al.

U.S. Appl. No. 11/061,337, filed Feb. 18, 2005, Kumar, et al.

U.S. Appl. No. 11/141,619, filed May 31, 2005, Kumar, et al.

U.S. Appl. No. 11/141,533, filed May 31, 2005, Kumar, et al.

European Search Report dated Mar. 9, 2006 mailed Mar. 22, 2006 for European Patent Application Serial No. EP05107794, 7 Pages.

Anonymous: "The Sun Global RFID Betwork Vision: Connecting Businesses at the Edge of Network" Internet Article, Jul. 2004, http://www.sun.com/software/solutions/rfid/Sun_RFIS_Vision_rla.pdf.

European Search report dated Oct. 4, 2006 and mailed Apr. 11, 2006 for EP 05108005, 9 pages.

European Search Report dated May 11, 2006, mailed May 12, 2006 for European Patent Application Serial No. EP05107744, 9 pages.

European Search Report dated Mar. 9, 2006, mailed Mar. 27, 2006 for European Patent Application Serial No. EP05107744, 7 pages.

Floerkemier, et al. "PML Core Specification 1.0" Sep. 13, 2003, Auto-ID Center, Version 1.0, 48 pages.

International Search Report dated and mailed Jul. 27, 2007 for PCT Application Serial No. PCT 2007/004005, 6 pages.

* cited by examiner

HOT SWAP AND PLUG-AND-PLAY FOR RFID DEVICES

CROSS-REFERENCE TO RELATED APPLICATION(S)

This application claims the benefit of U.S. Provisional Patent Application Ser. No. 60/606,281 filed on Sep. 1, 2004, entitled "SYSTEM AND METHODS THAT FACILITATE RFID SERVER PROGRAMMING MODEL AND API'S," and U.S. Provisional Patent Application Ser. No. 60/606,577 filed on Sep. 2, 2004, entitled "FACILITATE RFID SERVER PROGRAMMING MODEL AND API'S." This application is also related to co-pending U.S. patent application Ser. Nos. 11/069,459, 11/025,702, 11/061,356, and 11/061,337 filed on Mar. 1, 2005, Dec. 29, 2004, Feb. 18, 2005, and Feb. 18, 2005, respectively. The entireties of these applications are incorporated herein by reference.

BACKGROUND OF THE INVENTION

Many retail, manufacture, and distribution establishments are applying different and innovative operating methods to increase efficiency. These establishments can monitor store inventory to facilitate optimizing supply and demand relating to consumers. One aspect of maximizing profit hinges on properly stocking inventory such that replenishment occurs in conjunction with exhaustion of goods and/or products. For example, a retailer selling a computer and/or a VCR, must stock the computer in relation to its consumer sales, and the VCR in relation to its consumer sales. Thus, if the computer is in higher demand (e.g., more units sold) than the VCR, the retailer can stock the computer more frequently in order to optimize supply and demand, and in turn, profit. Monitoring inventory and associated sales can be a complex task, wherein product activity is comparable to a black box since inner workings are unknown; yet monitoring products is a crucial element in inventory/product efficiency.

Automatic identification and data capture (AIDC) technology, and specifically, Radio Frequency Identification (RFID) has been developed based at least upon the need to cure deficiencies of typical monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product.

Moreover, RFID systems and/or methodologies provide real-time data associated to a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g., distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and an RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between about 125 to 134 kilohertz), high frequency tags (about 13.56 megahertz), UHF tags (about 868 to 956 megahertz) and Microwave tags (about 2.45 gigahertz).

In general, an RFID system can include multiple components: tags, tag readers (e.g., tag transceivers), tag writers, tag-programming stations, circulation readers, sorting equipment, tag inventory wands, etc. Moreover, various makes, models, types, and/or applications can be associated with respective components (e.g., tag, tag readers, tag programming stations, circulation readers, sorting equipment, tag inventory wands, . . . ), which can complicate compatibility within the RFID system and with other RFID systems. In view of the above, there is a need to provide a uniform way to incorporate various makes, models, types, and/or applications into disparate RFID systems.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate detecting and incorporating a device to a target within an RFID network. A hot swap component can detect a new device within an RFID network, wherein such device can be associated with a process executing therein. The new device can be any device that is introduced and/or re-introduced into the RFID network, wherein the RFID network can be a collection of devices that form a sub-system based at least in part upon a process, a location, an event, and/or functionality. The new device can be integrated into the RFID network and seamlessly associated with a process without the process having to restart, stop, and/or be reconfigured. In other words, the hot swap component allows a new device to be "hot swapped" into the RFID network and invokes a plug-and-play configuration for any suitable device. The device can be, but is not limited to, an RFID reader, an RFID writer, an RFID printer, a printer, a reader, a writer, an RFID transmitter, an antenna, a sensor, a real time device, an RFID receiver, a real time sensor, a device extensible to a web service, and a real time event generation system.

Moreover, the hot swap component can preserve the collection of data and/or events related to the RFID network. The hot swap component can allow the runtime to continue collecting data and/or events in relation to the RFID network, when a process is down and/or exchanged with a disparate process. Thus, a first process can be switched with a disparate process, wherein the hot swap component provides the continuous collection of data and/or events associated with the first process during the switch with the disparate process. In one example, the disparate process can be a newer process than the first process.

In accordance with one aspect of the subject invention, the hot swap component can include a detector component that facilitates discovering at least one new device introduced and/or re-introduced to the RFID network. The detector component can employ an automatic discovery technique, a manual discovery technique, and/or any combination thereof. In the automatic discovery technique, the new device can transmit an identification signal (e.g., a ping) to the RFID network to signal existence. In the manual discovery technique, the new device can be identified by a configuration file utilized to identify such devices.

In accordance with another aspect of the subject invention, the hot swap component can include an analyzer component that can analyze at least one of a new device and any data related to such new device. In one example, the analyzer component can analyze newly introduced device, a re-introduced device, a process associated with the new device, data associated with the new device, and/or identification data related to the new device. For instance, the new device can be analyzed to determine at least one of the type of device, the brand of the device, the capabilities of the device, the identification of the device (e.g., unique identification number, name, serial number, uniform resource identifier (URI), uniform resource locator (URL), map point, location, etc.), and the new processes contained within the device. The analyzer component can also determine if the new device has additional events not related to an existing process, a process not existing within the RFID network, and/or an association with a new device collection not already associated with any process.

In accordance with still another aspect, the hot swap component can include a match component that can associate the new device with at least one target within the RFID network, wherein the target can be, but is not limited to, an RFID process, a collection/assortment of devices, and/or an event. In other words, the new device can be associated with an existing RFID process within the RFID network such that data collection and related processes need not be restarted, stopped, and/or reconfigured. Furthermore, the match component can utilize the unique identification data of the new device to match to the target. The match component can further employ a wildcard technique that allows a text character to represent any text character to facilitate matching unique identification data to the target.

In accordance with another aspect of the subject invention, the hot swap component can utilize a traffic component that maintains a flow of data collection between the new device and the process within the RFID network during a hot swap. Moreover, the hot swap component can invoke a health component that determines at least one of a level of deterioration of a device and maintenance requirements of a device within the RFID network. In yet another aspect of the subject invention, a security component can provide at least one security attribute in association with the addition of the new device. Furthermore, a management component can manage identification data by utilizing a batch technique. In other aspects of the subject invention, methods are provided that facilitate detecting and incorporating a device to a target within an RFID network.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
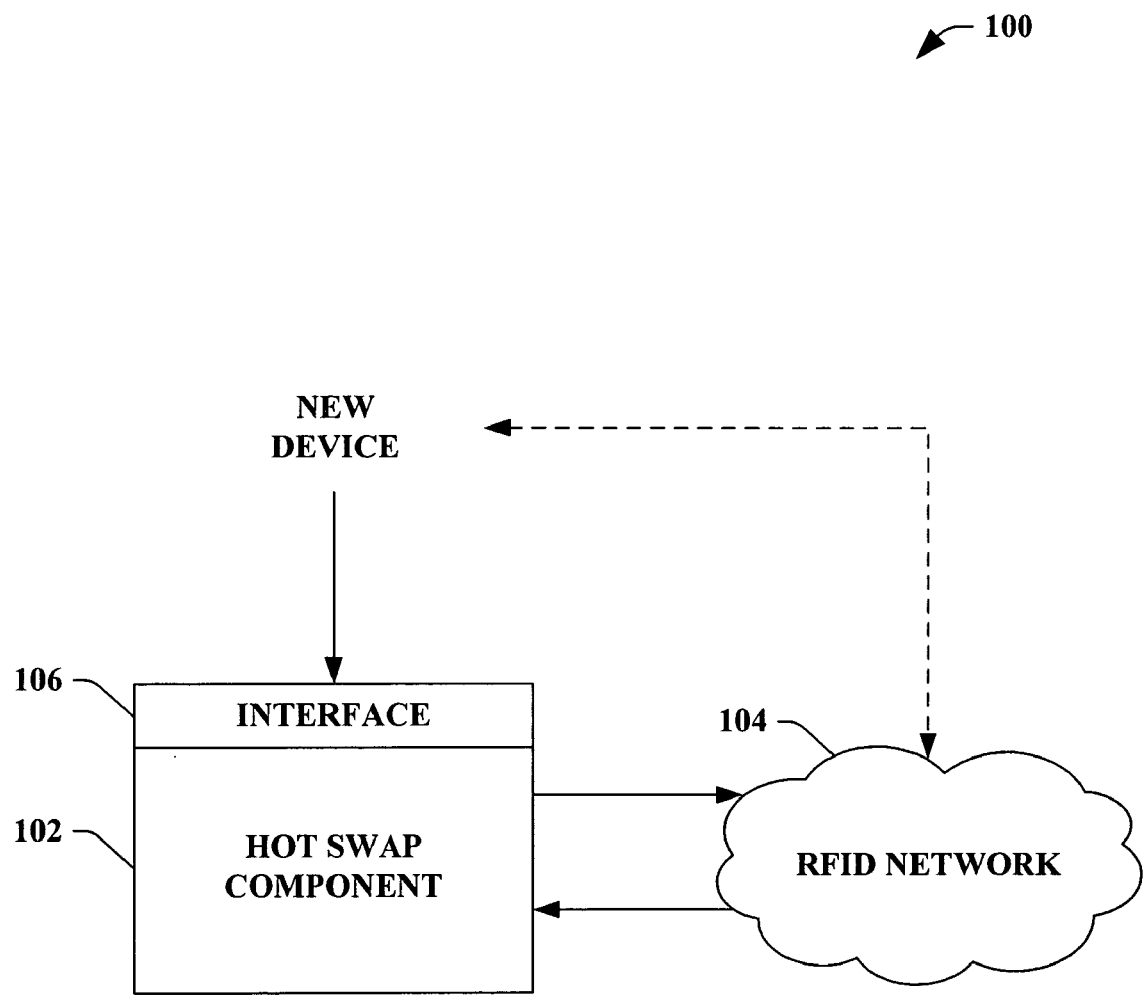
FIG. 1 illustrates a block diagram of an exemplary system that facilitates associating a device to an RFID network.

As utilized in this application, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Now turning to the figures, FIG. 1 illustrates a system 100 that facilitates associating a device with an RFID network. A hot swap component 102 can provide seamless incorporation of a new device to a radio frequency identification (RFID) network 104. The hot swap component 102 can detect the new device, wherein the device can be associated with at least one of an RFID process and an event. It is to be appreciated that a new device refers to a device being introduced and/or re-introduced into the system 100. For instance, a device that is part of the RFID network 104 can contain a defect and/or require maintenance such that the device is to be replaced. The hot swap component 102 allows a new device and/or a replacement device to enter the RFID network 104 without the need of stopping, reconfiguring, and/or restarting an RFID process utilizing such device replaced and/or removed. The device can be any suitable compatible RFID device that can be utilized with the RFID network 104. The device can be, but is not limited to, an RFID reader, an RFID writer, an RFID printer, a printer, a reader, a writer, an RFID transmitter, an antenna, a sensor, a real time device, an RFID receiver, a real time sensor, a device extensible to a web service, a real time event generation system, etc.

Moreover, the hot swap component 102 can preserve the collection of data and/or events related to the RFID network 104. The hot swap component 102 can allow the runtime to continue collecting data and/or events in relation to the RFID network 104, when a process is down and/or exchanged with a disparate process. Thus, a first process can be switched with a disparate process, wherein the hot swap component provides the continuous collection of data and/or events associated with the first process during the switch with the disparate process. In one example, the disparate process can be a newer process than the first process.

For example, an RFID process can be related to a particular RFID sub-system (e.g., an RFID server, RFID network, etc.) that is an uber or high-level object that forms together various entities to create a meaningful unit of execution. The RFID process can be an outbound process (e.g., pick, pack, shipping scenario, etc.), a manufacturing process, a shipping process, a receiving process, tracking, data representation, data manipulation, data application, security, . . . . Additionally, the RFID process can include an RFID device service, a tag read, an event (discussed infra), a tag write, a device configuration, a geographic tracking, a number count, etc.

In another example, the RFID network 104 can include at least one RFID device that is associated with at least one RFID process. It is to be appreciated that the RFID process can utilize any suitable number of RFID devices within the RFID network 104. A new device can be introduced into the RFID network 104 to be associated and/or implemented with the RFID process. The new device can be a newly added device, a replacement device, a device previously removed, a repaired device, . . . . In other words, the new device can be any device that is added to the RFID network 104 that is unassociated with an RFID process. Once introduced, the hot swap component 102 can associate the new device with the appropriate RFID process based at least upon an identification data related to the new device.

The system 100 further includes an interface component 106, which provides various adapters, connectors, channels, communication paths, etc. to integrate the hot swap component 102 into virtually any operating and/or database system(s). In addition, the interface component 106 can provide various adapters, connectors, channels, communication paths, etc., that provide for interaction with the hot swap component 102, the new device, and the RFID network 104. It is to be appreciated that although the interface component 106 is incorporated into the hot swap component 102, such implementation is not so limited. For instance, the interface component 106 can be a stand-alone component to receive or transmit data in relation to the system 100. In particular, the interface component 106 can receive any data relating to a newly introduced device that is to be associated with an RFID process on the RFID network 104. For instance, the interface component 106 can receive identification data, process related data, and/or any data associated with a device.

Figure 2:
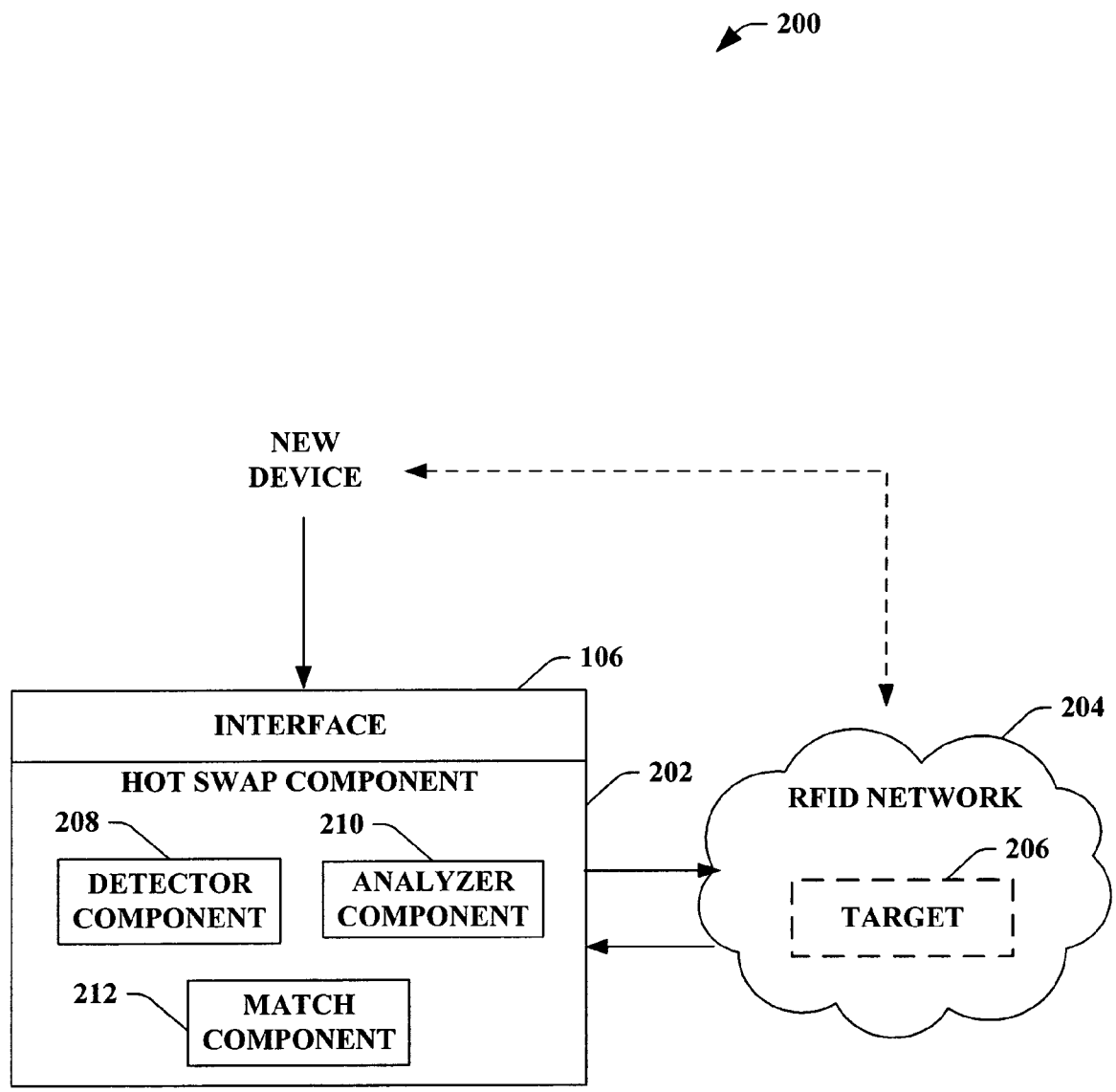
FIG. 2 illustrates a block diagram of an exemplary system that facilitates detecting and incorporating a device to a target within an RFID network.

FIG. 2 illustrates a system 200 that facilitates detecting and incorporating a device to a target within an RFID network. A hot swap component 202 can provide a seamless integration of a new device into an RFID network 204 without a related RFID process stopping, reconfiguring, and/or restarting, thus providing decreased downtime and an increase in return on investment (ROI). The hot swap component 202 can incorporate the newly connected device (e.g., a replacement device, a new device, a repaired device, a re-located device, etc.) to be associated with a target 206 within the RFID network 204. The target can include an RFID process within the RFID network 204, a collection/assortment of devices, and/or any data related to an RFID process within the RFID network 204. In other words, the new device can be associated with an existing RFID process within the RFID network 204 such that data collection and related processes need not be disturbed. The device can be, but is not limited to, an RFID reader, an RFID writer, an RFID printer, a reader, a writer, an RFID transmitter, an antenna, a sensor, a real time device, an RFID receiver, a real time sensor, a device extensible to a web service, a real time event generation system, etc. It is to be appreciated that the hot swap component 202 and the RFID network 204 can be substantially similar to the hot swap component 102 and the RFID network 104 as depicted in FIG. 1.

The hot swap component 202 can include a detector component 208 that can detect a new device that can be related to the RFID network 204. The detector component 208 can utilize a manual discovery, an automatic discovery, and/or any combination thereof. For example, the detector component 208 can utilize an automatic discovery, wherein the device can send out a ping periodically when such devices are available allowing the RFID network 204 to become aware of device availability. In another example, the detector component 208 can utilize a manual discovery, wherein a configuration file can be employed to load in a device configuration and utilize such configuration in an RFID process definition (via a wildcard technique discussed infra).

For example, an RFID network 204 can consist of a collection of devices (e.g., device1, device 2, and device3), wherein such devices can be related to an RFID process that monitors incoming shipments at a specified docking door. The RFID process can include various events such as, but not limited to, a tag read, a tag read error, a device up event, a device down event, and other management events. In this example, the event can be a tag read at prescribed times. If a new device is incorporated to the collection of devices at the specified docking door, the detector component 208 can either automatically detect the device and/or manually detect such device. In addition, a replacement device can be introduced to the specified docking door, wherein the detector component 208 can further employ automatic techniques, manual, techniques and/or any combination thereof to identify at last one newly introduced device that is to be incorporated with the RFID network 204.

The hot swap component 202 can include an analyzer component 210 that can analyze at least one of the newly introduced device, a process associated with the newly introduced device, data associated with the new device, and/or identification data related to the new device. For instance, the new device can be analyzed to determine at least one of the type of device, the brand of the device, the capabilities of the device, the identification of device (e.g., unique identification number, name, serial number, uniform resource identifier (URI), uniform resource locator (URL), map point, location, etc.), and the new processes contained within the device. It is to be appreciated that such examples are not to be limiting on the subject invention and that the analyzer component 210 can analyze any suitable data related to the new device in order to facilitate incorporating the new device into the RFID network 206.

In one example, the analyzer device can analyze a newly inserted device into the RFID network 204. For instance, the new device can be plugged in (e.g., powered up, brought within range of signal, etc.) and detected, wherein such new device can be analyzed to determine a characteristic associated with the new device such as, but not limited to, a device name, a device identification, a device process, and/or a device capability. In other words, the analyzer component 210 facilitates determining the capacity in which to incorporate the new device into the RFID network 204.

The hot swap component 202 can further include a match component 212 that can associate a new device to a target 206 within the RFID network 204, wherein the target can be, but is not limited to, an RFID process within the RFID network 204, a collection/assortment of devices, and/or any data related to an RFID process within the RFID network 204. The match component 212 can relate at least one new device to zero or more targets based at least in part upon a unique identification data associated with the new device. For instance, the identification data can be a device name, a serial number, an Internet protocol (IP) address, uniform resource identifier (URI), uniform resource locator (URL), map point, location, etc. By utilizing the identification data, the match component 212 can match and/or bind a target to a particular detected new device. If a match is found for a process, the new device can be associated with the process. Additionally, an event from the new device can be added to a queue of events that need to be processed by the matched RFID process.

The match component 212 can provide at least one of the following: 1) matching of a device to a device collection (within an RFID process) utilizing fully formed device and/or wildcard-ed device identifications; 2) dynamically discovering devices which can map the device to zero or more processes; and 3) adding devices online to a device collection of an RFID process (e.g., adding the events from newly matched devices to the queue of events that need to be processed by an RFID process).

For example, the match component 212 can employ a wildcard technique, wherein a designated character can be utilized to represent any character with the description of identifying devices with the unique identification data. For instance, a "*" can signify the representation of any character and a match can be made if the wildcard ("*") allows a match between a new device and a target to be made. Thus, if a process is named "DockDoor," with devices "DockDoor1," "DockDoor2," and "DockDoor3" a new device can be matched to the process if the identification data (in this case the device name) is "DockDoor*." It is to be appreciated that any character can be employed to represent a wildcard and that the subject invention is not limited to employing the "*" character as such. In addition, the wildcard technique can be utilized in conjunction with the process name.

In accordance with one aspect of the subject invention, the match component 212 can map a device collection within the RFID process to the physical device. For example, the mapping can be to one of the following: a specific reader Internet protocols (IP)(e.g., 168.192.38.21, 168.192.38.22, 168.192.38.23); a wildcard collection, (e.g., 168.192.38.*), where * is a wildcard that designates any suitable matching character; a combination of the specific IP and the wildcard (e.g., 168.192.38.21, 168.38.22, 168.192.39.*). It is to be appreciated that the implementation of a wildcard collection can be more versatile in expansion of physical devices. For instance, utilizing the wildcard, a user can assign an IP address within a wildcard collection range, wherein the mapping address is compatible to the existing RFID process. If specific IP addresses are used, such new assigned IP would need to be incorporated into the mapping.

In one example, an RFID process can contain devices that match to the process name "ACME*." Assuming there are currently three devices named ACME1, ACME2, and ACME 3 on the network, the devices can match to the "ACME*" string relate to the RFID process named as such. In one case, the device ACME1 can be replaced with a new ACME device (e.g., perhaps ACME1 needs maintenance, is damaged, etc.). The new device can be named ACME4 based at least in part upon automatic discovery, manual discovery, and/or identification data when the new device is connected to the RFID network 204. The hot swap component 202 can allow the swapping of device ACME 1 with ACME4, such that the RFID network 204 can discover such device. In addition, since the device ACME4 matches with the RFID process name (e.g., ACME* matches to ACME4 based at least in part upon the * character signifying a wildcard that can be utilized to represent any character). Thus, the device ACME4 can become part of the RFID process without having to stop, reconfigure, and/or restart such RFID process.

In another case following the above example, a new device can be added to the RFID network 204, wherein the device can be named ACME5 (e.g., a new device that has never been associated with the RFID process relating to the devices (ACME1, ACME2, and ACME3). The hot swap component 202 and related components can allow the plugging in of device ACME5, ensuring of discovery, and adding the device ACME5 as part of the RFID process automatically. In view of the above, it is to be appreciated that the system 200 can provide at least one of the following: 1) matching of a device to a device collection within an RFID process utilizing fully formed device identification and/or a wildcard technique device identification; 2) dynamically discovering a device followed by matching logic to map a device to zero or more processes; and 3) online addition of devices to a device collection of an RFID process (e.g., adding the events from newly matched devices to the queue of events that need to be processed by an RFID process). Thus, by utilizing the appropriate device names while forming a device collection of an RFID process, the user can achieve hot swap and/or plug-and-play (PNP) for devices associated with the RFID process.

Figure 3:
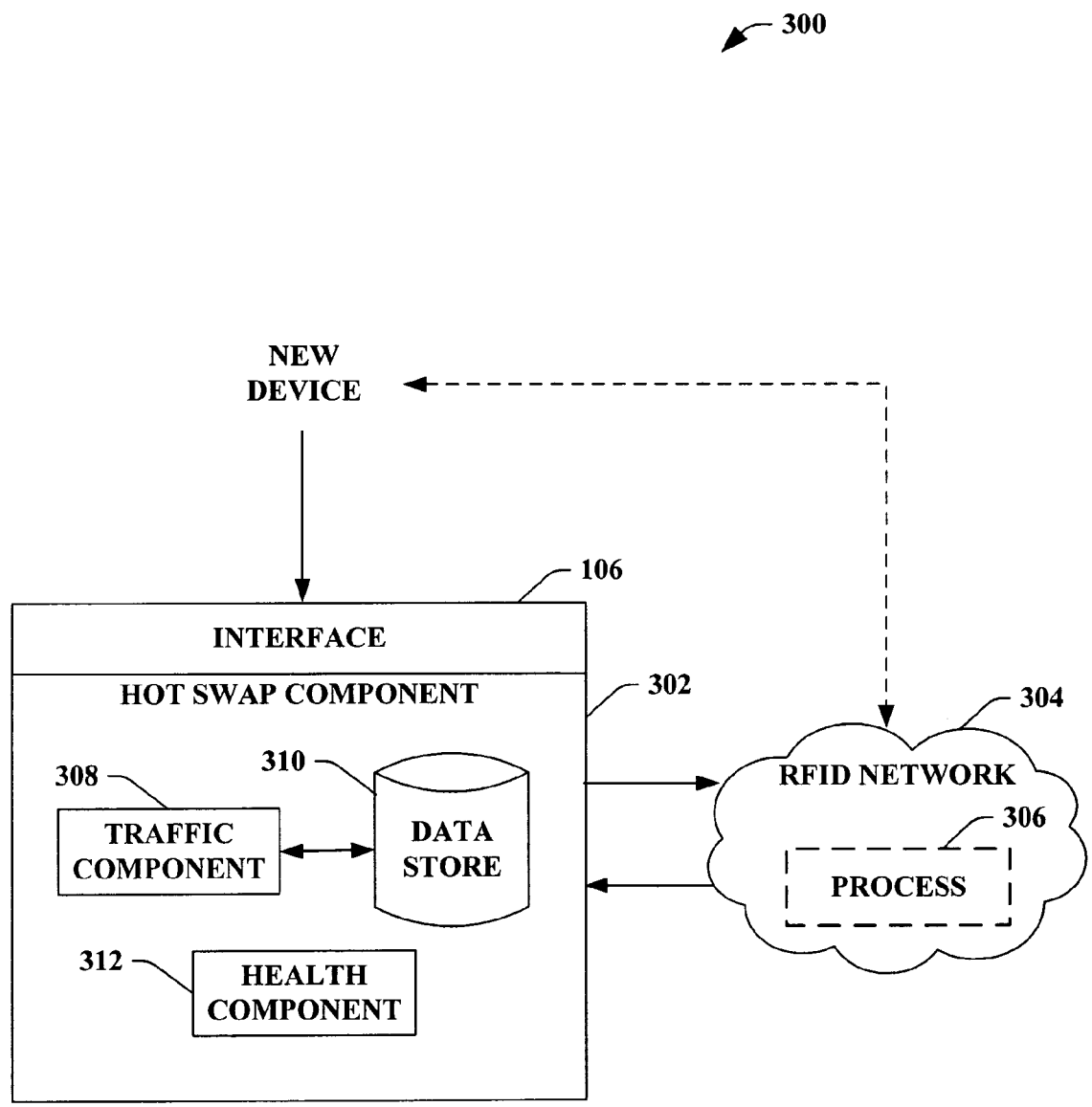
FIG. 3 illustrates a block diagram of an exemplary system that facilitates adding a device to an RFID network and associated a process to such device.

FIG. 3 illustrates a system 300 that facilitates adding a device to an RFID network and associated a process to such device. A hot swap component 302 can implement a seamless integration of a new device into an RFID network 304 without requiring a related process 306 to stop, reconfigure, and/or restart, thus mitigating errors involved therewith. The new device can include an RFID reader, an RFID writer, an RFID printer, a printer, a reader, a writer, an RFID transmitter, an antenna, a sensor, a real time device, an RFID receiver, a real time sensor, a device extensible to a web service, a real time event generation system, etc., wherein the device can be new to the RFID network 304, re-introduced to the RFID network 304, replacing a pre-existing device in the RFID network 304, and/or a device added to the RFID network 304. It is to be appreciated that the hot swap component 302 and the RFID network 304 can be substantially similar to the hot swap component 202, 102 and the RFID network 204, 104 of FIGS. 2 and 1 respectively.

The process 306 is an uber and/or high-level object that can provide a meaningful unit of execution. For instance, the process 306 can be a shipping process that represents multiple devices at various dock doors working together to perform tag reads, filtering, read enrichment, alert evaluation, and data storage in a sink for a host application to retrieve/process. In another example, the process 306 is a manufacturing process, wherein devices are configured to read as well as write dependent upon a location. Moreover, additional functions such as filtering, enriching, etc. can be implemented at the location. In yet another example, the process 306 is a tag write process, wherein a tag can be written in real-time based at least upon an input. The write process can also check if the write succeeded by reading and passing data back to the host.

The hot swap component 302 can include a traffic component 308 to facilitate communication and/or data collection in relation to the system 300. In particular, the traffic component 308 can mitigate errors during the replacement, addition, and/or re-introduction of a device to the RFID network 304. The traffic component 308 can maintain the flow of data collection (e.g., data collected) between a new device and a process 306 within the RFID network 304 during the hot swap and/or plug-and-play (PNP). For instance, a device that requires maintenance and/or repairs can be replaced by a new device. The hot swap component 302 can invoke a seamless integration of the new device into the RFID network and any related process(es) 306. Yet, during the replacement, there is a time lapse involved such that during such time data is to be collected, the process 306 is to be executing, and/or other data is to be aggregated in relation to the device. The traffic component 308 can maintain the data collection during such time lapse in between installation and/or execution of a process 306. In addition, the traffic component 308 can further maintain the collection of data related to devices within the RFID network 304 during any downtime of the process 306.

The hot swap component 302 can further include a data store 310 that can store various data related to the system 300. The data store can provide storage for data collected via a device, data during a time lapse, identification data, a table related to the association of at least one process and at least one device, a name listing of at least one of a device and/or a process, and a device collection arrangement. The data store 310 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 310 of the subject systems and methods is intended to comprise, without being limited to, these and any other suitable types of memory. In addition, it is to be appreciated that the data store 310 can be a server, a database, and/or a hard drive.

The hot swap component 302 can include a health component 312 that can determine the deterioration of a device and/or maintenance of a device associated with a process 306 within the RFID network 304. The health component 312 can analyze an existing device within the RFID network 304 and determine if such device is down, unavailable, damaged, and/or any condition that disallows the device from collecting data. If the device is unable to collect data, the health component 312 can provide the necessary precautions in relation to the process 306, a new device (e.g., that is to replace the device), the traffic component 308, and/or the data store 310. For example, the health component 312 can determine the deterioration of a device by analyzing the data collected from such device. The data collected can be compared, for instance, to a sample set, wherein a pre-set percentage of error can be utilized to determine if a device is to be replaced and/or repaired. It is to be appreciated that the health component 312 can invoke any suitable mechanism to determine the deterioration of a device and such above examples are not to be limiting on the subject invention.

Figure 4:
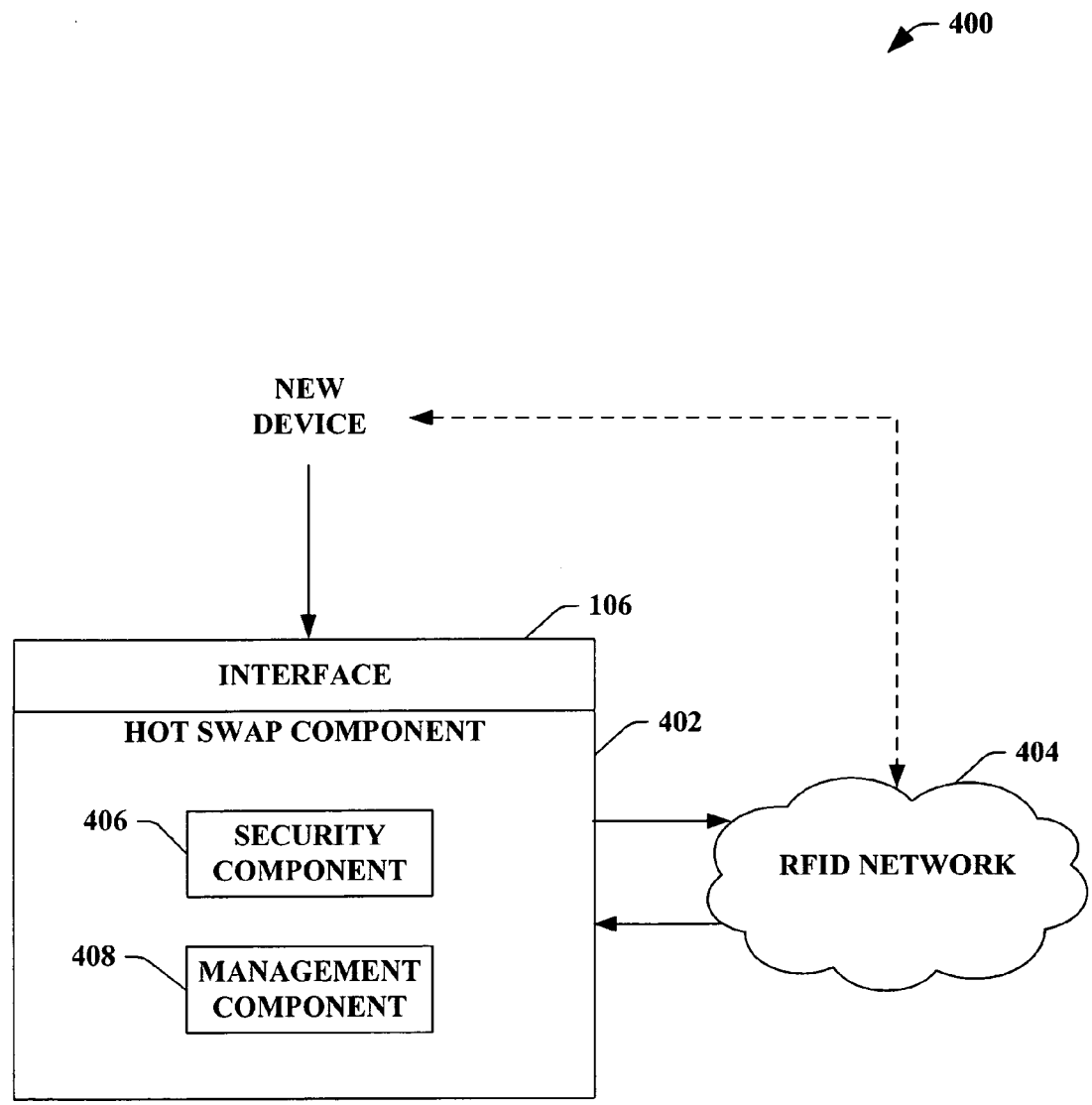
FIG. 4 illustrates a block diagram of an exemplary system that facilitates providing security and management associated with incorporating a device to an RFID network.

FIG. 4 illustrates a system 400 that facilitates providing security and management associated with incorporating a device to an RFID network. A hot swap component 402 can invoke an automatic incorporation of a new device to an RFID network 404 by associating the new device to a process based at least in part upon identification data related to the new device. Furthermore, the hot swap component 402 can provide such incorporation of the new device without the stopping, reconfiguring, and/or restarting of the process to which the new device is to be made part. The device can be, but is not limited to, an RFID reader, an RFID writer, an RFID printer, a printer, a reader, a writer, an RFID transmitter, an antenna, a sensor, a real time device, an RFID receiver, a real time sensor, a device extensible to a web service, a real time event generation system, etc. It is to be appreciated that the hot swap component 402 and the RFID network 404 can be substantially similar to respective components/networks described in previous figures.

The hot swap component 402 can include a security component 406 to provide at least one security attribute to the system 400. For instance, the security component 406 can utilize a user profile such that particular additions of a new device are associated therewith. For example, a user name and password can be associated to specific device collections such that a particular user can add and/or incorporate a new device to a device collection and an associated RFID process. By providing such user name and password, the system 400 can provide a log of users and/or devices that have been incorporated and/or added to the RFID network 404. Furthermore, the security component 406 can utilize various security measures such as, but not limited to, a login, a password, biometric indicia (e.g., a fingerprint, a retinal scan, inductance, . . . ), voice recognition, etc. to ensure the integrity and validity of the particular entity incorporating a new device. The security component 406 can further employ any suitable security attribute associated to the RFID network 404.

The hot swap component 402 can further include a management component 408 facilitates managing identification data related to respective devices within the RFID network 404. The management component 408 can provide batch techniques associated to at least one or more devices and/or identification data related therewith. For example, the management component 408 can allow the editing of a device collection identification data, a device identification data, and/or a process identification data to provide a dynamic system 400 that can change accord to the device collections and/or processes. In one instance, a device collection can have the identification data as a name such as "ShippingDoor," wherein such configuration can change to become a receiving door. Rather than keeping the device identification data (e.g., device names) to an inconsistent convention, the management component 408 can provide a batch change to the device collection and/or processes associated with the "ShippingDoor."

Figure 5:
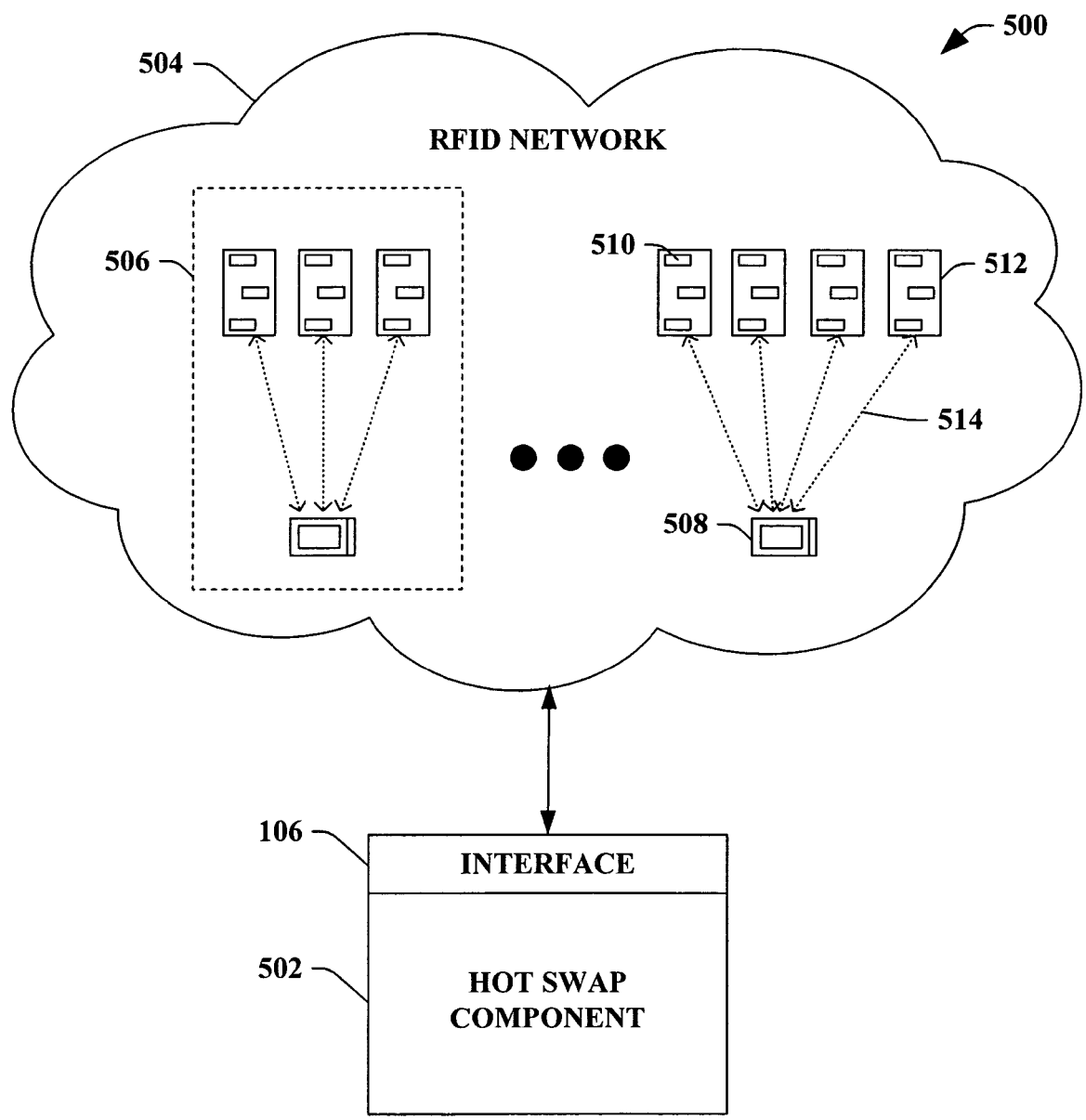
FIG. 5 illustrates a block diagram of an exemplary system that facilitates incorporating a device to an RFID network.

FIG. 5 illustrates a system 500 that facilitates incorporating a device to an RFID network. A hot swap component 502 can allow a seamless integration of a device into an RFID network 504 without the requirement of restarting, stopping, and/or reconfiguring a process related therewith. The hot swap component 502 provides a hot swap and/or a plug-and-play feature to new devices that are to be added to the RFID network 504. It is to be appreciated that the hot swap component 502 and the RFID network 504 can be substantially similar to respective components/networks described in previous figures.

The RFID network 504 can include a plurality of universes (e.g., sub-systems, RFID networks), wherein a universe is a server of RFID entities. For simplicity, the RFID network 504 illustrates a single universe containing two collections of devices (e.g., device collections), where a first collection 506 is shown. For instance, an RFID sub-system can be a location wherein the entities involved are related to a substantially similar process. In one example, a sub-system can be a warehouse containing a plurality of receiving and/or shipping dock doors with associated devices. Thus, first collection 506 can be a collection of devices within the specified sub-system. It is to be appreciated a plurality of collection of devices can be implemented. Within a collection of devices, an device 508 can receive an RFID signal 514 from a pallet of goods 512 containing at least one RFID tag 510. It is to be appreciated the pallets and/or goods can be tagged based at least upon user specifications (e.g., single pallets tagged, individual goods tagged, pallets and goods tagged, etc.).

A new device can be added to an existing first collection 506 and/or start a new collection (not shown). The new device can be a newly added device, a replacement device, a device previously removed, a repaired device, . . . . Once the new device is activated, the hot swap component 502 can detect the new device and associate the device with a particular process based at least in part upon the new device identification data (e.g., a device name, a serial number, an Internet protocol (IP) address, etc.). It is to be appreciated that the new device can be incorporated into the RFID network 504 without any complications involved with the running process related to the first collection 506. In other words, the new device can be incorporated into the RFID network 504 without a restart, a stop, and/or reconfigure of the process.

Figure 6:
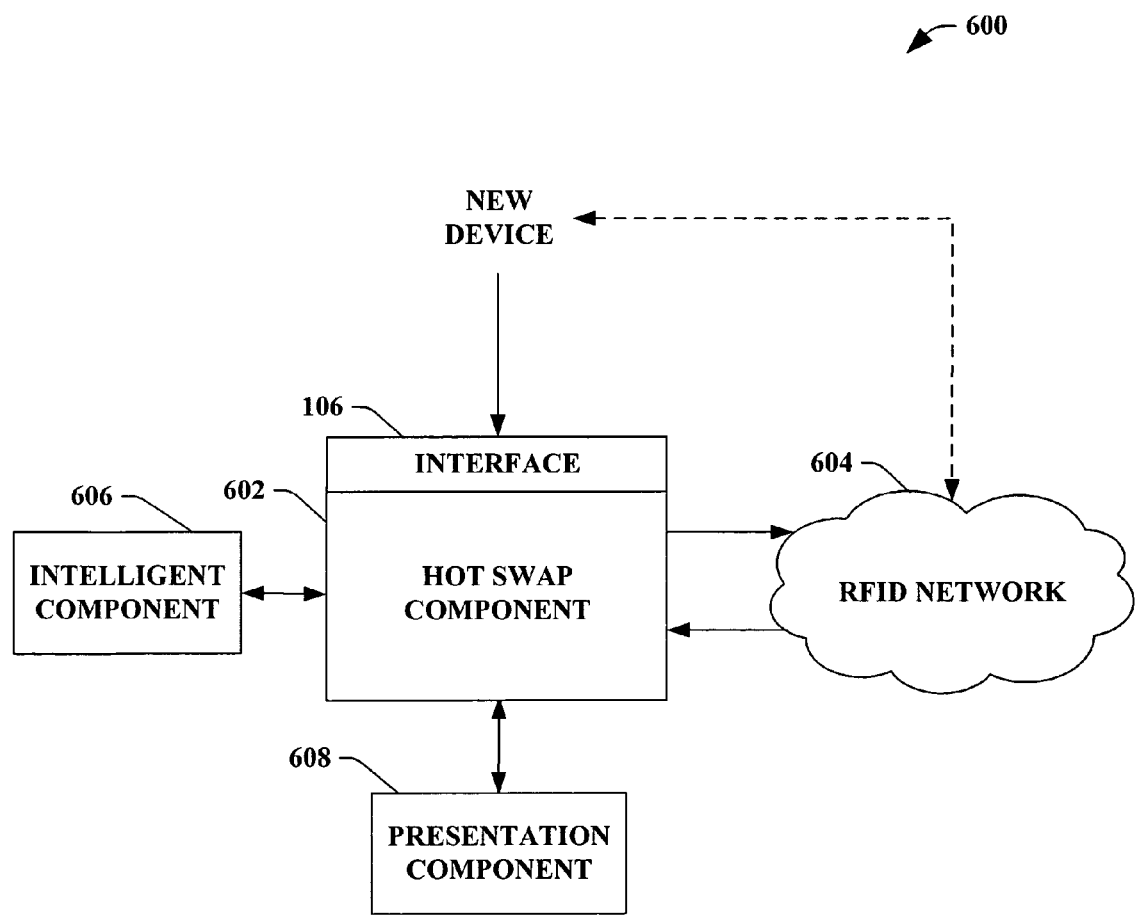
FIG. 6 illustrates a block diagram of an exemplary system that facilitates detecting and adding a device to a process related to an RFID network.

FIG. 6 illustrates a system 600 that employs intelligence to facilitate incorporating a device to an RFID network and associating a process with such device. The system 600 can include a hot swap component 602, an RFID network 604, and an interface 106 that can all be substantially similar to respective components/networks described in previous figures. The system 600 further includes an intelligent component 606. The intelligent component 606 can be utilized by the hot swap component 602 to facilitate incorporating a device to an RFID network based at least in part upon identification data associated with the device allowing the addition of the device to a process. For example, the intelligent component 606 can be utilized to analyze a new device, identification data, security characteristics, a process, an event, etc.

It is to be understood that the intelligent component 606 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 608 can provide various types of user interfaces to facilitate interaction between a user and any component coupled to the hot swap component 602. As depicted, the presentation component 608 is a separate entity that can be utilized with the hot swap component 602. However, it is to be appreciated that the presentation component 608 and/or similar view components can be incorporated into the hot swap component 602 and/or a stand-alone unit. The presentation component 608 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the hot swap component 602.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the invention is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
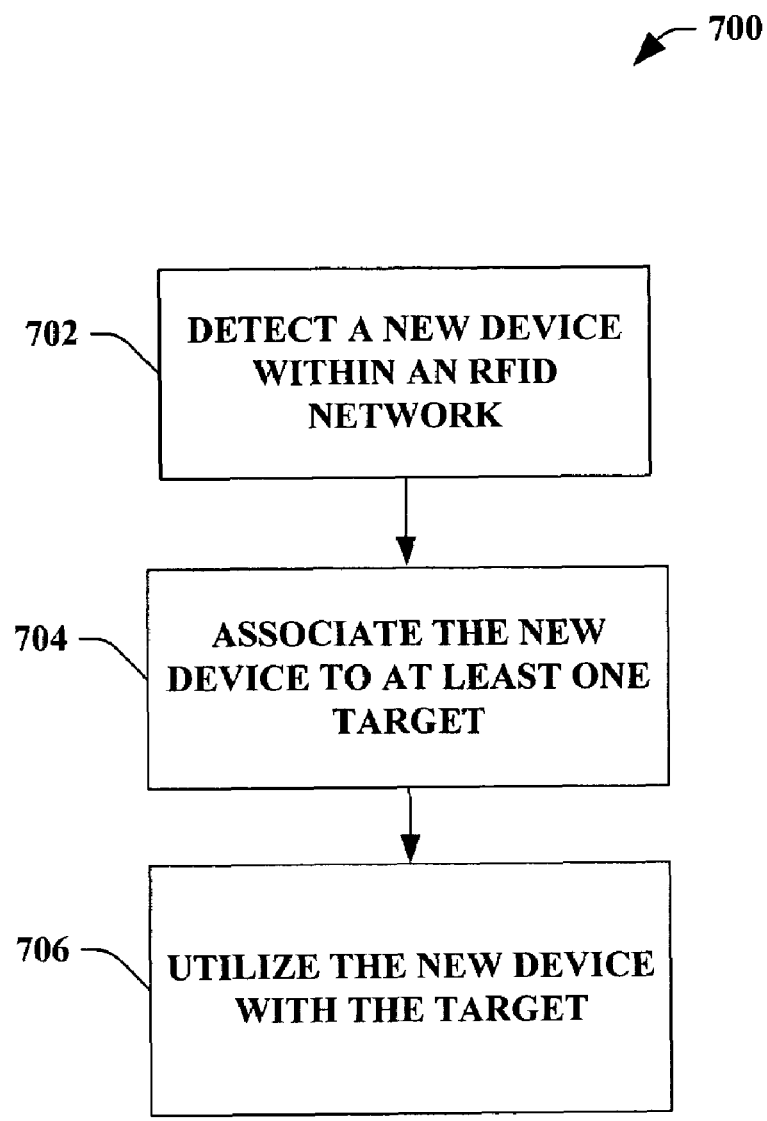
FIG. 7 illustrates an exemplary methodology for discovering a device and utilizing such device with a process associated with an RFID network.
Figure 8:
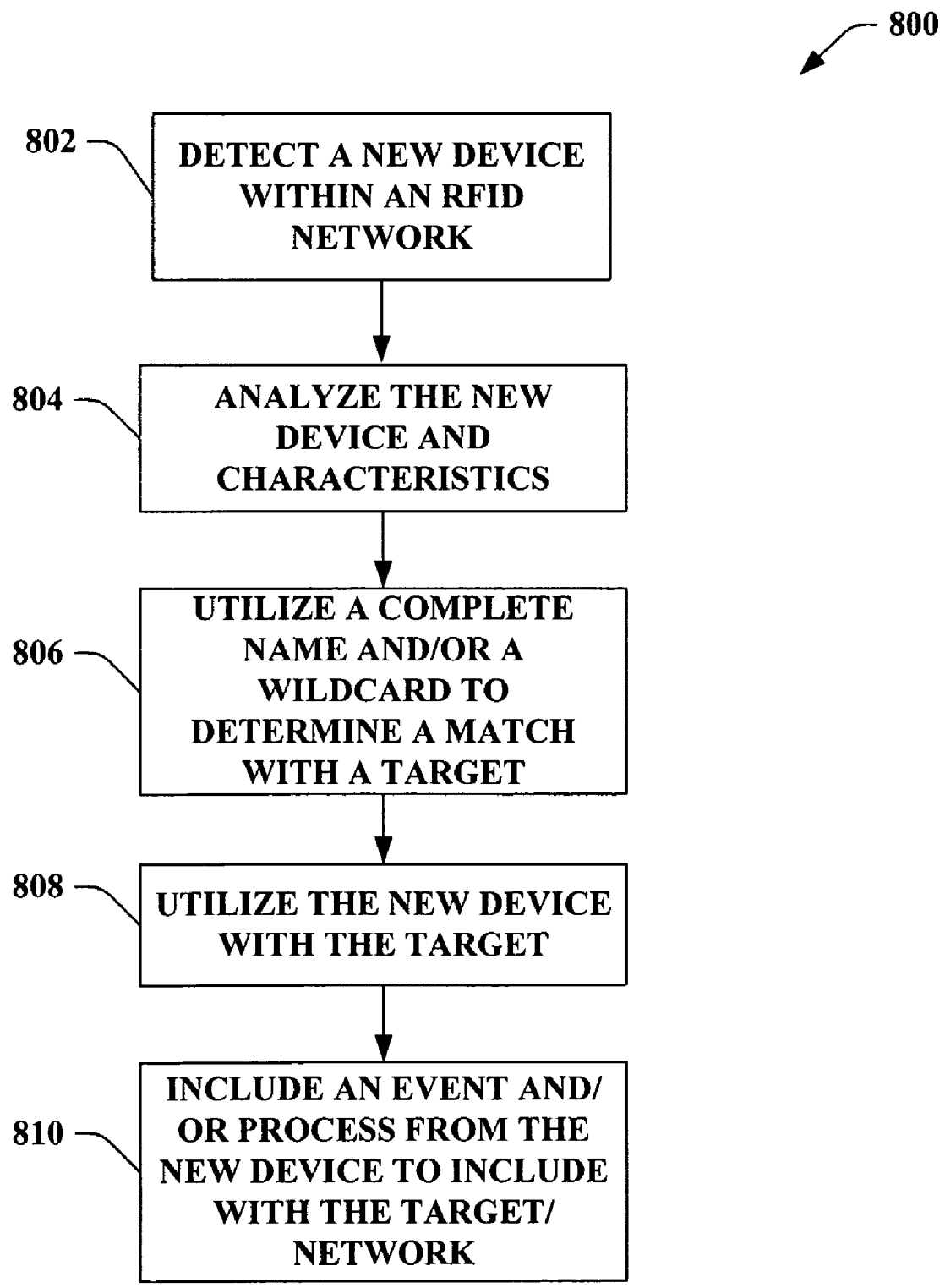
FIG. 8 illustrates an exemplary methodology that facilitates incorporating a device and characteristics respective therewith to an RFID network.

FIGS. 7-8 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 7 illustrates a methodology 700 for discovering a device and utilizing such device with a process associated with an RFID network. At reference numeral 702, a new device can be detected within an RFID network. The new device can be a newly added device, a replacement device, a device previously removed, a repaired device, . . . . For instance, the new device can be a replacement device for a damaged and/or deteriorated device within the RFID network. It is to be appreciated that the device can be, but is not limited to, an RFID reader, an RFID writer, an RFID printer, a printer, a reader, a writer, an RFID transmitter, an antenna, a sensor, a real time device, an RFID receiver, a real time sensor, a device extensible to a web service, and a real time event generation system.

At reference numeral 704, the new device detected can be associated to at least one existing target, wherein the target can be, but is not limited to, an RFID process within the RFID network, a collection/assortment of devices, and/or an event related to an RFID process within the RFID network. The association can relate one new device to zero or more targets based at least in part upon unique identification data associated with the new device. For instance, the identification data can be a device name, a serial number, an Internet protocol (IP) address, uniform resource identifier (URI), uniform resource locator (URL), map point, location, etc. By utilizing the identification data, the target can be matched to a particular detected new device. If a match is found to a process, the new device can be associated with the process. Additionally, an event from the new device can be added to a queue of events that need to be processed by the matched RFID process. At reference numeral 706, the new device can be utilized with the target. For example, the new device can be invoked as part of a process within an RFID network.

FIG. 8 illustrates a methodology 800 that facilitates incorporating a device and characteristics respective therewith to an RFID network. At reference numeral 802, a new device within a network (e.g., an RFID network) can be detected. The detection can be an automatic detection, a manual detection, and/or any combination thereof. The new device can include a newly added device, a replacement device, a device previously removed, a repaired device . . . , wherein the device can be, but is not limited to, an RFID reader, an RFID writer, an RFID printer, a printer, a reader, a writer, an RFID transmitter, an antenna, a sensor, a real time device, an RFID receiver, a real time sensor, a device extensible to a web service, and a real time event generation system. At reference numeral 804, the new device can be analyzed to determine at least one of a device type, a device brand, a device configuration, a characteristic associated with the device, a device unique identification data, a process stored within the device, an event list associated with the device, . . . .

At reference numeral 806, a match can be made with a target within the network based at least in part upon the unique identification data of the device. The unique identification data can be a device name, a serial number, uniform resource identifier (URI), uniform resource locator (URL), map point, location, and/or an Internet protocol (IP) address. For example, the matching of the new device to an existing process can be done by associating a device name with a process name. It is to be appreciated that a wildcard technique can be employed with the matching method described herein. In one instance, the process can be named utilizing a wildcard character wherein such character can allow any matching device name to be associated therewith. Thus, a process named "ACMEDOOR*" (where "*" signifies a wildcard character) can have the new device matched to it if the new device was named, for example, "ACMEDOOR4."

At reference numeral 808, the new device can be utilized with the target to implement the seamless integration of a new device with an existing process. At reference numeral 810, an event from the new device can be included with an existing process. For example, a new device can add an event of writing a tag within a device collection of reading devices. In such case, the new device can add the event of a write to the existing process associated to the appropriate device collection. In another example, the new device can include a completely manipulate an existing process to be implemented with the new device and/or the new device and existing devices.

Figure 9:
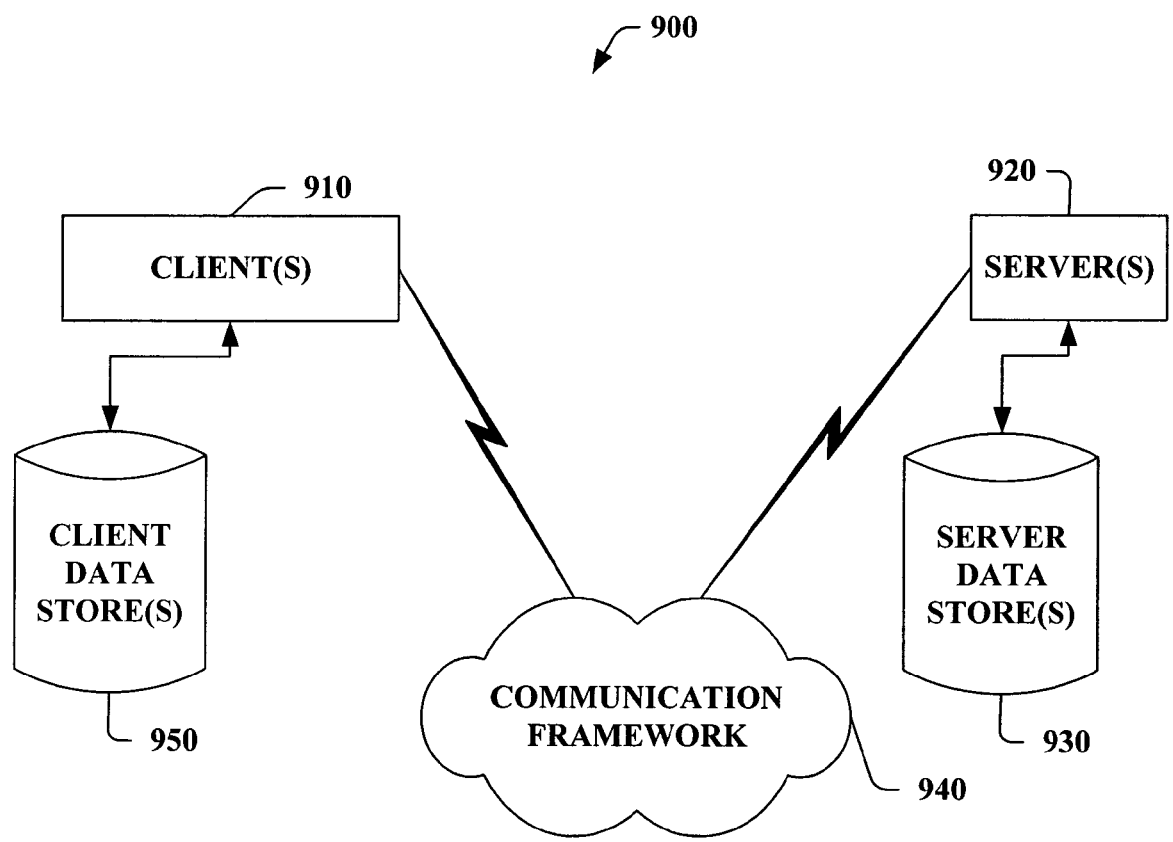
FIG. 9 illustrates an exemplary networking environment, wherein the novel aspects of the subject invention can be employed.
Figure 10:
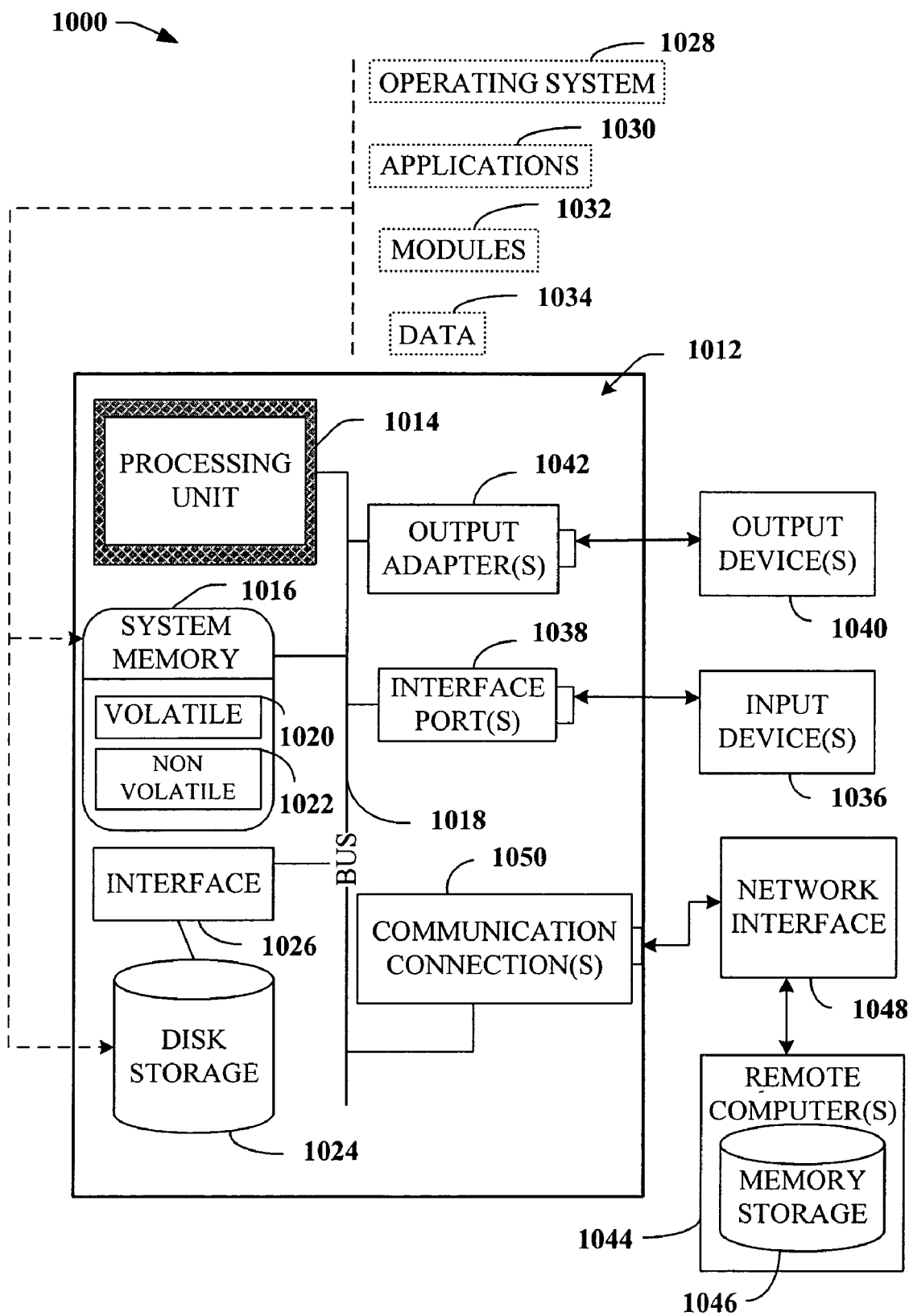
FIG. 10 illustrates an exemplary operating environment that can be employed in accordance with the subject invention.

In order to provide additional context for implementing various aspects of the subject invention, FIGS. 9-10 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject invention, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates incorporating a device into an RFID network, comprising:
    an interface that receives a new device and related identification data;
    a hot swap component that seamlessly adds the new device to a process currently being executed within the RFID network based at least in part upon the identification data;
    a match component that provides an association of the new device to the process during execution based at least in part upon the identification data utilizing a wildcard technique wherein the new device is matched to a device collection utilizing a wildcard-ed device identification and adds the new device online to the device collection of the RFID process by adding an event from a newly matched device to a queue of events that is processed by the RFID process.

2. The system of claim 1, the new device is one of the following: an RFID reader; an RFID writer; an RFID printer; a printer; a reader; a writer; an RFID transmitter; an antenna; a sensor; a real time device; an RFID receiver; a real time sensor; a device extensible to a web service; and a real time event generation system.

3. The system of claim 1, the new device is one of the following: a device introduced into the RFID network; a device re-introduced into the RFID network; a newly added device; a replacement device; a device previously removed; a repaired device; and a re-located device.

4. The system of claim 1, the identification data is at least one of a unique identification number, a device name, a serial number, an uniform resource identifier (URI), an uniform resource locator (URL), a map point, a location, and an Internet protocol (IP) address.

5. The system of claim 1, the process is a high-level object that forms together at least one entity to create a meaningful unit of execution that relates to at least one of the following: an outbound process; a manufacturing process; a shipping process; a receiving process; a tracking process; a data representation process; a data manipulation process; a security process; and a process utilizing one of an RFID device service, a device collection, a tag read, an event, an event queue, a tag write, a device configuration, and a number count.

6. The system of claim 5, the event is one of the following: a tag read; a tag read error, a device up event; a device down event; and a management event.

7. The system of claim 1, the RFID network comprises a collection of devices that form a sub-system which includes:
    an RFID reader that receives an RFID signal; and
    an RFID tag that transmits to at least one device.

8. The system of claim 1, further comprising a detector component that can discover the new device by at least one of an automatic discovery and a manual discovery.

9. The system of claim 1, further comprising an analyzer component that analyzes at least one of the new device, a new device name, a device identification, a device process, a new device type, a new device brand, a new device configuration, a characteristic of the new device, a process related to the new device, an event list associated with the new device, and a new device capability.

10. The system of claim 1, further comprising a traffic component that maintains the collection of data related to the device within the RFID network during a downtime of the process.

11. The system of claim 10, the traffic component maintains a flow of data collection between the new device and the process within the RFID network during a hot swap.

12. The system of claim 1, further comprising a health component that determines at least one of a deterioration of a device and maintenance of a device within the RFID network.

13. The system of claim 1, further comprising a security component that provides at least one security attribute in association with the addition of the new device.

14. The system of claim 1, further comprising a management component that manages identification data of the device collection by utilizing a batch technique.

15. A computer readable medium having stored thereon the components of the system of claim 1.

16. A computer-implemented method that facilitates incorporating a device into an RFID network, comprising:
  detecting at least a new device within the RFID network;
  receiving wild card-ed identification data of the new device;
  including the new device with a device collection by matching the wild card-ed identification data of the new device with identification data of the device collection; and;
  employing the new device in execution of at least one ongoing process by including events from the new device into an event queue being processed within the ongoing process.

17. A computer-implemented system that facilitates incorporating a device into an RFID network, comprising:
  means for detecting a new device;
  means for receiving the new device and related wild card identification data;
  means for including the new device within a device collection by matching the identification data of the new device with wild card identification data of the device collection; and
  means for seamlessly adding the new device to an ongoing process within the RFID network based at least in part upon the identification data by including events from the new device into an event queue that is executed within the ongoing process.

18. The system of claim 17, further comprising means to facilitate communication and data collection during the seamless addition of the new device to the ongoing process.

19. The system of claim 14, the management component dynamically changes the device collection identification data in accordance with a process to be executed.

20. The method of claim 16, further comprising dynamically changing the identification data associated with the device collection utilizing batch techniques in accordance with a process to be executed by the device collection.

* * * * *